United States Patent [19]

Iizuka et al.

[11] Patent Number: 4,950,528
[45] Date of Patent: Aug. 21, 1990

[54] ANTI-SEISMIC RUBBER

[75] Inventors: Masao Iizuka; Atsuhiko Yasaka; Yoshide Fukahori; Toshikazu Yoshizawa, all of Tokyo, Japan

[73] Assignees: Bridgestone Corporation; Kajima Corporation, both of Tokyo, Japan

[21] Appl. No.: 295,625

[22] Filed: Jan. 10, 1989

[30] Foreign Application Priority Data

Jan. 26, 1988 [JP] Japan .................................. 63-15425

[51] Int. Cl.$^5$ .......................... B32B 7/02; B32B 25/04
[52] U.S. Cl. ................................ 428/212; 52/167 R; 267/152; 428/492
[58] Field of Search ............. 52/167 R; 248/609, 621; 428/492, 212; 267/152; 367/176

[56] References Cited

U.S. PATENT DOCUMENTS

| | | | |
|---|---|---|---|
| 3,938,852 | 2/1976 | Hein et al. ............................. | 276/152 |
| 4,050,665 | 9/1977 | Matthews ......................... | 52/167 R |
| 4,483,426 | 11/1984 | Tagawa et al. .................... | 52/167 R |
| 4,566,231 | 1/1986 | Konsevich ......................... | 52/167 R |
| 4,761,925 | 8/1988 | Fukahori et al. ................ | 428/621 X |
| 4,899,323 | 2/1990 | Fukahori et al. .................... | 367/176 |

Primary Examiner—Thomas J. Herbert
Attorney, Agent, or Firm—Kanesaka and Takeuchi

[57] ABSTRACT

An anti-seismic rubber is made by laminating a plurality of rigid plates and flexible plates having viscoelastic properties alternatively. At least one of the flexible plates A has elasticity, i.e. magnitude of the stress corresponding to an arbitrary strain in a stress-strain curve, lower than the elasticity of other flexible plates B in a low strain zone, and in a high strain zone, elasticity of the flexible plate A is higher than the elasticity of the flexible plate B.

7 Claims, 3 Drawing Sheets

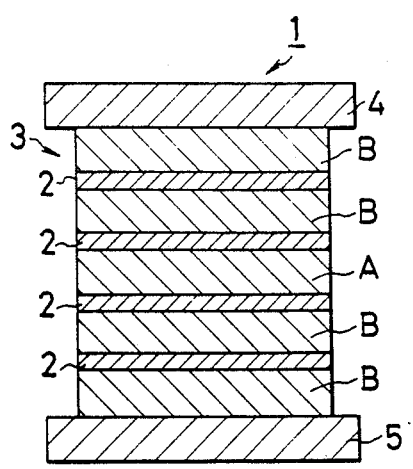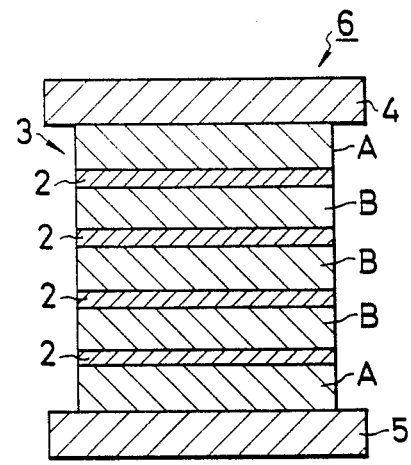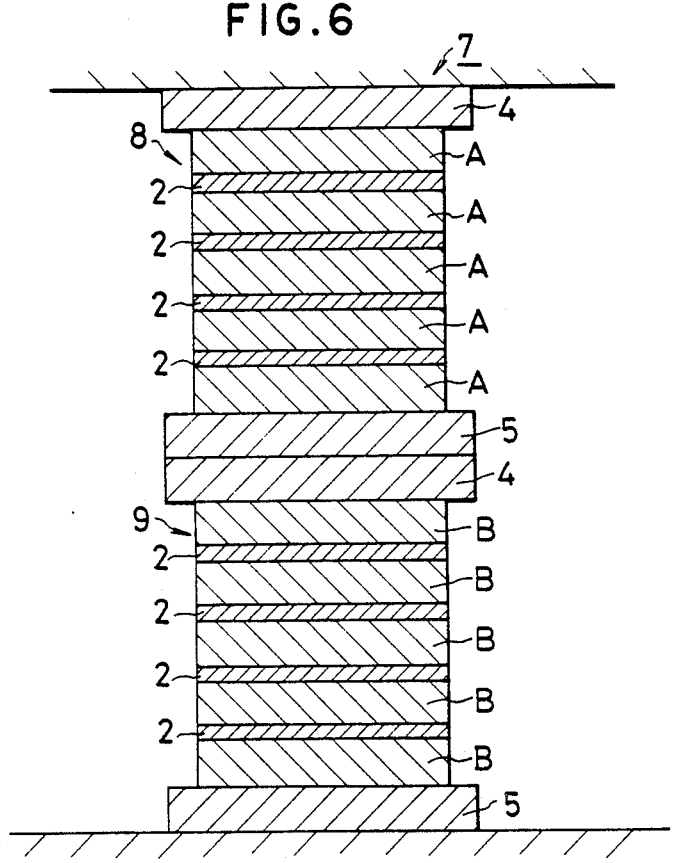

ANTI-SEISMIC RUBBER

FIELD OF THE INVENTION AND RELATED ART STATEMENT

The present invention relates to an anti-seismic rubber laminated with a plurality of rigid plates and a plurality of flexible plates having viscoelastic properties bonded to each other alternatively, which displays anti-seismic effect in the case of an earthquake and, together with that, in a usual time, the effect of damping minute vibration. More particularly, the present invention relates to an anti-seismic rubber which has in itself two effects, i.e. anti-seismic effects, of spring effect owned by a usual anti-seismic rubber and damping effect owned by a damper at the time of earthquake, and together with that, which, when no earthquake occurs, has the function of damping small vibrations, such as traffic vibration and machine vibration.

Structures made by laminating rigid plates such as steel plates and flexible plates having viscoelastic properties such as rubber or the like with each other are widely used as supporting members in buildings and machines in which vibration-proof properties, vibration absorbing properties are requested.

The functional effects of the anti-seismic rubber such as described above are to shift a vibration period of a concrete building from a period of an earthquake, which is obtained by inserting an anti-seismic structures flexible to transverse direction, that is, small shear rigidity, between a rigid structures such as a reinforced concrete building and the foundation thereof. Due to such an effect, by the anti-seismic design in which an anti-seismic rubber is inserted between a building and the foundation thereof, acceleration applied to the building subject to earthquake becomes very small. However, the building is slowly swayed transversely and a large relative displacement is generated between the building and the foundation, and when the relative displacement is large, there is the fear of generating collision of the building to other structures destruction of water pipes, gas pipes, wirings and the like. Heretofore, in order to make the transverse sway displacement small, anti-seismic rubber and a damper have been used by installed in parallel. However, the method of installing the anti-seismatic rubber and the damper in parallel makes installing operation complicated and brings cost uprise to a large extent. At present, as one of the counter measures therefor, a plan is under consideration, in which an interior of the anti-seismic rubber is hollowed and lead is buried into this part, and by utilizing the plastic deformation of lead at the time of an earthquake, damping effect is imparted to the anti-seismic rubber to have combination of the spring effect and the damper effect.

However, in the anti-seismic rubber containing lead, there is the fear of inducing the rupture of the whole anti-seismic rubber, because in the case of large deformation of the anti-seismic rubber at the time of a large earthquake, the rigid plate such as steel or the like injures lead, and the injured lead further injures the flexible plate made of rubber or the like. Furthermore, injured lead has the risk of being ruptured by the repetition of large deformation.

OBJECT AND SUMMARY OF THE INVENTION

An object of the present invention is to solve the above described problems and provide an anti-seismic rubber showing high damping anti-seismic characteristics in a high strain zone.

Another object of the present invention is to provide an anti-seismic rubber which behaves as a rigid anti-seismic rubber in a low strain zone.

Another object of the present invention is to provide an anti-seismic rubber which possesses damping effect for minute vibration, and spring effect and damping effect for large deformation at the time of earthquake.

A further object of the present invention is to provide an anti-seismic rubber which is capable of obtaining wind-proof stability and damping effect for minute earthquake.

The anti-seismic rubber of the present invention is formed by laminating a pluralality of rigid plates and a plurality of flexible plates having viscoplastic properties alternatively, wherein at least one flexible plate (in the following, refered to as a flexible plate A) has elasticity lower than the elasticity of other flexible plates (in the following, refered to as a flexible plate B) in a low strain zone, and the elasticity of the flexible plate A is higher than that of the flexible plate B in a high strain zone.

Further, in the present invention, so-called elasticity of a material (flexible plate) means, in a stress-strain curve of a nonlinear material, magnitude of stress corresponding to an arbitrary strain, and not the gradient of a tangent.

In an anti-seismic rubber having such a structure as described above, when deformation is given thereon, the characteristics of a flexible plate having low elasticity are strongly shown in that small deformation region.

That is, in a region where the strain is small, since the elasticity of the flexible plate A is lower than that of the flexible plate B, the deformation of the flexible plate A appears prior to that of the flexible plate B to reveal the characteristics of the flexible plate A strongly, and the anti-seismic rubber shows as a whole low elasticity.

On the other hand, in the region where the strain is large, since the elasticity of the flexible plate B is lower than that of the flexible plate A, the characteristics of the flexible plate B, i.e. the high hysteresis property are strongly revealed.

As a result, the anti-seismic rubber of the present invention behaves as a low elasticity anti-seismic rubber in the low strain zone, but in the high strain zone, shows high damping anti-seismic characteristics.

In effect, the anti-seismic rubber of the present invention is the one which possesses all the effects, i.e., the damping effect to minute vibration, and the spring effect and damper effect to the large deformation at the time of earthquake.

By the way, by providing high damping characteristics (high hysteresis loss) to the flexible plate, it is possible to make a high damping anti-seismic rubber which possesses combination of spring effect and damper effect.

However, in such high damping anti-seismic rubber as described above, since the stress-strain relation of the flexible plate having high hysteresis properties has high elasticity in a low strain zone as shown in FIG. 2, the high damping anti-seismic rubber as a laminate structure shows high rigidity in a low strain zone. As a result, although such an anti-seismic rubber as described above is extremely excellent as an anti-seismic rubber, effect of damping minute vibration becomes deficient due to the high rigidity in the low strain zone.

According to the anti-seismic rubber of the present invention, such decrease of the damping effect in the low strain zone is not caused and an anti-seismic rubber having excellent anti-seismic characteristics in the high strain zone is provided.

BRIEF DESCRIPTION OF THE DRAWINGS

FIGS. 4, 5, and 6 show the longitudinal sectional views of the anti-seismic rubber according to the present invention.

DESCRIPTION OF THE PREFERRED EMBODIMENTS

In the following, embodiments will be explained in detail by referring to drawings.

Figure 1:
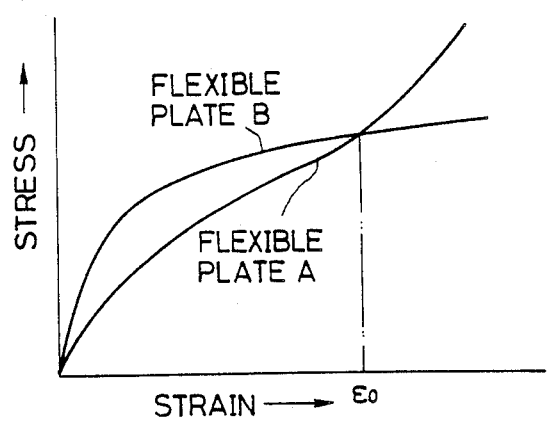
FIGS. 1, 2, and 3 are the diagrams for showing the elasticity or stress-strain characteristics of a flexible plate.
Figure 2:
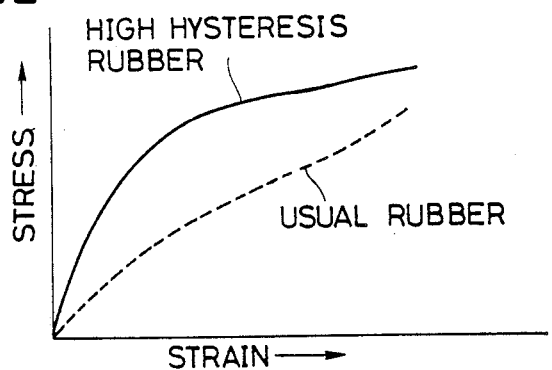

FIGS. 4, 5, and 6 are diagrams for showing the longitudinal cross-sectional view of the anti-seismic rubber according to the present invention, and FIG. 1 is a stress-strain curve of a flexible plate used therein.

In the anti-seismic rubber 1 of FIG. 4, rigid plates 2 and flexible plates A or B having viscoelastic properties are alternatively laminated to form an anti-seismic rubber body 3, and flanges 4 and 5 made of a rigid material are adhered to the upper and under surfaces thereof. Further, the flexible plate A is provided at the part approximately in the intermediate point of the flanges 4 and 5. Although in FIG. 4, only one sheet of the flexible plate A is shown, a plurality of sheets in the neighbourhood of the intermediate point of the flanges 4 and 5 may be replaced with the flexible plates A.

In the anti-seismic rubber 6 of FIG. 5, the flexible plates A contact the flanges 4 and 5. The other constitution is the same as the anti-seismic rubber of FIG. 4.

In the anti-seismic rubber 7 of FIG. 6, the first anti-seismic rubber body 8 and the second anti-seismic rubber body 9 are provided, and the anti-seismic rubber body 8 is formed as a laminate of flexible plates A and rigid plates 2 and the anti-seismic rubber body 9 is made as a laminate of flexible plates B and rigid plates 2. The constitution is such that upper and under surfaces of these anti-seismic rubber bodies 8 and 9 are provided the flanges 4 and 5, and via said flanges 4 and 5, the anti-seismic rubber bodies 8 and 9 are heaped up in two stages. The anti-seismic rubber bodies 8 and 9 may be formed of the anti-seismic rubber bodies 3 shown in FIGS. 4 and 5.

Although in FIG. 6, two flanges 4 and 5 are interposed between the anti-seismic rubber body 8 and the anti-seismic rubber body 9, between these anti-seismic rubber bodies 8 and 9 may be interposed only one flange.

Further, the anti-seismic rubber shown in the figure is an example of the present invention, and number of laminated plates of the flexible sheets and rigid plates is not limited to the one as shown in the figure. Also, the flange is not necessarily required.

The stress-strain characteristics of these flexible plates A and B are shown in FIG. 1. The flexible plate B has a rigidity lower than that of the flexible plate A in a high strain zone, and a rigidity higher than that of the flexible plate A in a low strain zone.

In the present invention, the strain zone wherein the strain is smaller than the strain $\epsilon_0$, at which the strain of these flexible plates A and B becomes equal, is called as a low strain zone, and the strain zone in which it is larger than $\epsilon_0$ is called as a high strain zone.

In the present invention, it is preferrable that $\epsilon_0$ exceeds 0% and is 200% or less, and especially is between $10^{-6}$ to 90%.

That is, the above-mentioned fact means that the ratio $E_A/E_B$ of the elasticity $E_A$ and $E_B$ of the flexible plates A and B when the strain is $\epsilon_0/2$ becomes less than 1, but it is preferable that $E_A/E_B$ becomes less than 0.8.

Also, in the present invention, it is preferable to make the hysteresis loss of the flexible plate A be smaller than the hysteresis loss of the flexible plate B.

Further, in the present invention, it is preferable to make the hysteresis ratio ($h_{100}$) of the flexible plate B at the time of deformation at 25° C. and 100% be in the range of 0.2 to 0.7.

In general, as a measure for the hysteresis loss characteristics and damping characteristics of the material is used the value of the loss tangent tan $\delta$.

However, as is widely known, tan $\delta$ is a value which is measured as the response delay for the stimulus of the minute vibration to a material, and is unsuitable as a parameter for describing the hysteresis loss characteristics of the material used in the anti-seismic structural body subject to large deformation which reaches to 100 to 200%.

Figure 3:
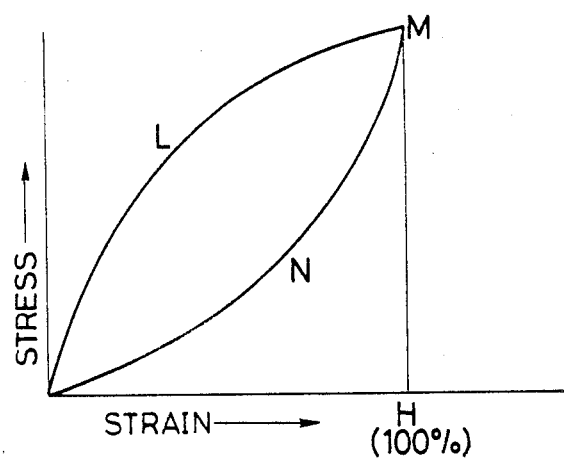

Therefore, in the present invention, the hysteresis ratio ($h_{100}$) of the material at the time elongation deformation at 25° C. and of 100% was taken as a measure of the loss characteristics. By the way, at the elongation speed of 200 mm/nin, $h_{100}$ is given by the surface area ratio in the stress-strain curve in FIG. 3.

$$h_{100} = \frac{OLMNO}{OLMHO}$$

Although $h_{100}$ is preferably selected as large as possible for the sake of the damper (damping) effect, such a selection necessarily makes the plastic deformation of the material large. Therefore, the preferable range of $h_{100}$ at 25° C. for making both characteristics good is in the range of $$0.2 \leq h_{100} \leq 0.7,$$

or more preferably, $$0.25 \leq h_{100} \leq 0.65$$

or further more preferably, $$0.3 \leq h_{100} \leq 0.6.$$

As the material of the flexible plates A and B for satisfying the above-described conditions, various kinds of rubber materials may be used such as the rubber composition product comprising following rubbers such as, for example, ethylenepropylene rubber (ERP-,EPDM), nitryl rubber (NBR), butyl rubber, halogenized butyl rubber, chloroprene rubber (CR), natural rubber (NR), isoprene rubber (IR), stylenebutadiene rubber (SBR), butadiene rubber (BR) and the like.

It is needless to say that these rubber compounds may contain mixing compounds generally used in rubber materials such as various fillers, aging preventing agents, plasticisers, softenning agents, oil and the like.

As the material of the flexible plate 2, a metal, ceramics, plastics, FRP, polyurethane, wood, paper plates, slate plates, smoothly plained plates, and the like can be used. The shapes of the rigid plate and the flexible plate may be circular or square, or in a polygonal shape such as pentagon, hexagon, or the like. For adhering the rigid plate and the flexible plate to each other, an adhesive is used or covulcanisation is utilized.

By the way, the anti-seismic rubber of the present invention has low rigidity in a low strain zone due to that it is made in the above-described composite structure and its damping properties i.e. hysteresis loss is small. When the rigidity is too low, a building becomes comparatively liable to be swayed against wind. Further, there is also caused a new problem such that the damping properties are deffficient and the anti-seismic effect is little. For such a case, the interior of the laminated body made of the flexible plate A is hollowed and a core of a viscoelastic substance C (including the viscoelastic material constituting the flexible plate B), in which the rigidity is higher than that of the soft plate A in the low strain zone, and the rigidity is lower than that of the soft plate A in the high strain zone and the hysteresis loss is larger than that of the flexible plate A, is buried, because, by forming the laminated body as described above, appropriate rigidity and damping properties can be obtained in a low strain zone also.

In the following, explanation will be given on embodiments by referring to drawings.

FIGS. 7, 8, 9, and 10 are diagrams for showing the longitudinal sectional views of the anti-seismic rubber according to the embodiments.

Figure 7:
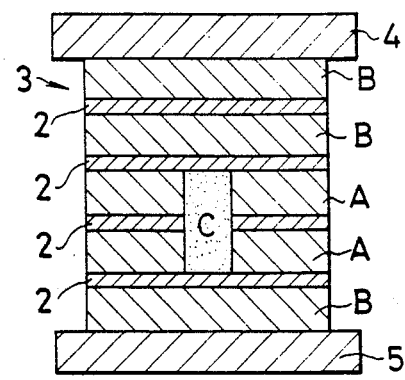
FIGS. 7, 8, 9, and 10 show the longitudinal sectional views of the anti-seismic rubber according to the present invention.

FIG. 7 shows the view in which a core consisting of a viscoelastic material C is provided in the center of a laminate comprising flexible plates A provided at approximately intermediate part of the flanges 4 and 5.

Figure 8:
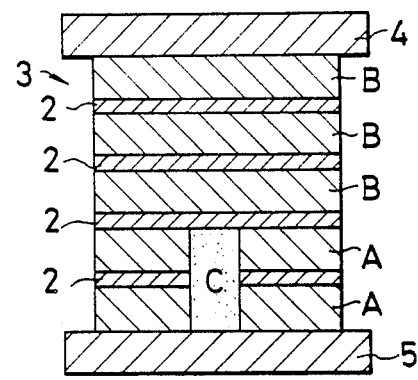

FIG. 8 shows the view in which one core consisting of a viscoelastic material C is provided in the center of a laminate comprising flexible plates A contacting to the flange 5.

Figure 9:
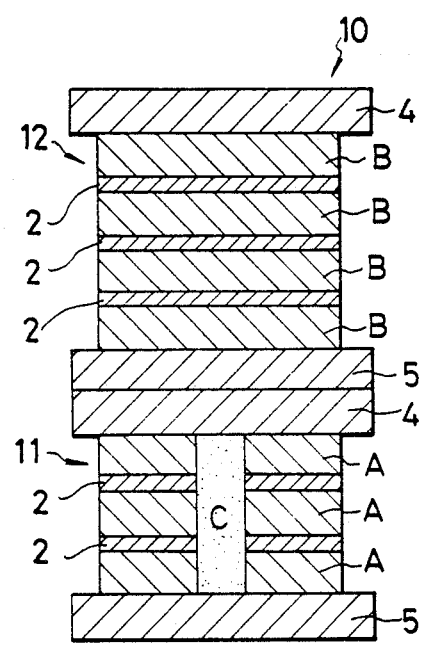

FIG. 9 shows the view in which an anti-seismic rubber 10 is heaped up with an anti-seismic rubber body 11 constituted with a laminate made of flexible plates A and an anti-seismic rubber body 12 constituted with a laminate made of flexible plates B. One core consisting of a viscoelastic substance is provided in the center of the laminate made of flexible plates A.

Figure 10:
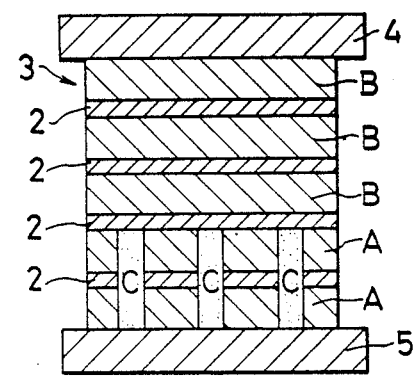

In the above explanation, although one core consisting of a viscoelastic substance was provided in the center, a plurality of cores consisting of a viscoelastic substance may be provided in the inside of a laminate comprising flexible plates A as shown in FIG. 10.

As explained above, the anti-seismic rubber of the present invention behaves in a low strain zone as an anti-seismic rubber having low rigidity, but on the other hand, in a high strain zone, shows high damping anti-seismic properties.

Therefore, the anti-seismic rubber of the present invention possesses the damping effect for minute vibration and spring effect and damping effect for the large deformation at the time of earthquake.

Also, by providing a core of a viscoelastic material in correspondence to needs, wind-proof stability and anti-seismic effect can also be obtained.

What is claimed is:

1. An anti-seismic rubber comprising:
   a plurality of rigid plates; and
   a plurality of flexible plates laminated alternatively with the rigid plates to be firmly bonded together, said flexible plates being formed of at least one flexible plate A and a plurality of flexible plates B, said flexible plates A and B having modulus of elasticity and high and low strain zones so that the elasticity of the flexible plate A is lower than that of the flexible plate B in the low strain zone, and higher than that of the flexible plate B in the high strain zone, said anti-seismic rubber showing as a whole characteristics based on the flexible plate A when stress in the low strain zone is applied to the anti-seismic rubber, and said anti-seismic rubber showing as a whole characteristics based on the flexible plates B when stress in the high strain zone is applied to the anti-seismic rubber.

2. An anti-seismic rubber as claimed in claim 1, wherein, in case strain is half of strain $\epsilon_0$ at which the stress to the flexible plate A and the flexible plate B becomes equal, ratio $E_A/E_B$ of elasticity $E_A$ of the flexible plate A and elasticity $E_B$ of the flexible plate B is more than 0 and 0.8 or less.

3. An anti-seismic rubber as claimed in claim 1, wherein hysteresis loss of the flexible plate A is smaller than hysteresis loss of the flexible plate B.

4. An anti-seismic rubber as claimed in claim 1, wherein hysteresis ratio ($h_{100}$) of the flexible plate B at the time of deformation of magnitude of 100% at a temperature of 25° C. is 0.2 to 0.7.

5. An anti-seismic rubber as claimed in claim 1, wherein said flexible plate A has low elasticity in the low strain zone, and said flexible plate B has high hysteresis property in the high strain zone.

6. An anti-seismic rubber as claimed in claim 1, wherein said anti-seismic rubber comprises first and second anti-seismic rubber bodies piled together, said first anti-seismic rubber body being formed of a plurality of the rigid plates and the flexible plates A alternatively laminated with each other, and said second anti-seismic rubber body being formed of a plurality of the rigid plates and the flexible plates B alternatively laminated with each other.

7. An anti-seismic rubber as claimed in claim 6, further comprising a core situated inside the first anti-seismic rubber body, said core being formed of a viscoelastic material having elasticity higher than the elasticity of the flexible plate A in the low strain zone and lower than the elasticity of the flexible plate A in the high strain zone, and hysteresis loss larger than hysteresis loss of the flexible plate A.

* * * * *

UNITED STATES PATENT AND TRADEMARK OFFICE
CERTIFICATE OF CORRECTION

PATENT NO. : 4,950,528

DATED : Aug. 21, 1990

INVENTOR(S) : Masao Iizuka et al

It is certified that error appears in the above-identified patent and that said Letters Patent is hereby corrected as shown below:

On the title page item [75] Inventors:
change "Yoshide Fukahori" to --Yoshihide Fukahori--.

Signed and Sealed this

Eighteenth Day of February, 1992

Attest:

HARRY F. MANBECK, JR.

Attesting Officer

Commissioner of Patents and Trademarks